J. C. BELL.
CHECK.
APPLICATION FILED AUG. 17, 1908.

971,107.

Patented Sept. 27, 1910.
2 SHEETS—SHEET 1.

*Fig.1.*

WITNESSES

INVENTOR
Attorney

J. C. BELL.
CHECK.
APPLICATION FILED AUG. 17, 1908.

971,107.

Patented Sept. 27, 1910.
2 SHEETS—SHEET 2.

*Fig. 2.*

WITNESSES

INVENTOR

UNITED STATES PATENT OFFICE.

JOHN C. BELL, OF CLEVELAND, OHIO.

CHECK.

971,107.  Specification of Letters Patent.  Patented Sept. 27, 1910.

Application filed August 17, 1908. Serial No. 448,987.

*To all whom it may concern:*

Be it known that I, JOHN C. BELL, a resident of Cleveland, in the county of Cuyahoga and State of Ohio, have invented certain new and useful Improvements in Checks; and I do hereby declare the following to be a full, clear, and exact description of the invention, such as will enable others skilled in the art to which it appertains to make and use the same.

This invention relates to improvements in checks and more particularly to an improved wage check or certificate,—the object of the invention being to so construct a wage check or certificate that it can be quickly prepared for issuance, and so that when prepared, it will accurately and unchangeably indicate the amount for which the check or certificate is issued.

A further object is to provide a wage check or certificate which cannot be "raised" or otherwise altered to state an amount of money different from that intended by the drawer.

With these objects in view the invention consists in certain novel features of construction and arrangement as hereinafter set forth and pointed out in the claims.

In the accompanying drawings Figure 1 illustrates a wage check or certificate embodying my invention and Fig. 2 is a similar view showing the manner in which the check is operated.

1 represents the check having thereon, preferably at one side thereof, a space 2 in which the name of the drawer or company issuing the check and also the name of the drawee or bank or other institution on which the check is drawn, are indicated. The space 2 also contains blank lines 3—4 to receive the names of the auditor and the treasurer of the company or other institution issuing the check. The space 2 also contains a number line 5, to receive the number of the employee who will be the payee in whose favor the check is issued. The words "Received payment" appear on the lower portion of the space 2 and below these words, a line 6 is provided for the name of the payee, so that when the check has been cashed, it will constitute a receipt from the employee.

Two blocks *a*, *b* of figures are printed or otherwise produced upon the check to the right of the space 2. The block *a* comprises ten columns and each column is divided into ten spaces. This block is designated as "tens dollars", and all the spaces of each column contain the same numeral, said numerals counting by "tens" across the columns composing the block, thus the spaces of the first column, at the left of block *a*, contain the number "90", the next "80" and so on, while the spaces in the last column, at the right of block *a*, contain ciphers. At the left of the block *a* is a column *c* containing the digits 1, 2, 3, 4, 5 in line with the lower five horizontal rows of numerals of the block *a*, and the column *c* also contains the words "Hundred dollars". At the right of the block *a* is a column *d* divided into 10 spaces which contain digits (beginning at the top) from 0 to 9 inclusive, in line respectively, with the horizontal rows of numbers in the block *a*. The space *e* between the block *a* and the column *d* contains words indicating that the digits in the column *d* are intended to be read as "units dollars". The block *b* is provided with columns, spaces and numerals precisely the same as the block *a*, but the numerals in the block *b* are intended to be read as "cents" counting by "tens" and the said block *b* is so designated by suitable words over the same. In the space *f*, between the block *b* and the column *d*, words are printed which denote that the "units dollars" are indicated in column *e* at the left and that "cents" are indicated in the block *b* at the right.

At the right of the block *b* a column *g* is provided. This column is divided into 10 spaces containing digits from 0 to 9. At the right of column *g* words are printed which denote that the digits in the column *g* at the left, indicate "units cents", while the space *h* between the block *b* and the column *g* contains words which denote that the digits in the column *g*, to the right, indicate "units cents", and that the numeral in the block *b*, to the left, indicates "tens cents".

Below the blocks and columns above described, a space *i* is provided and designated to contain a statement of the amount of money which would be sufficient to pay the employee in full for his services to the date indicated by a stamp which is produced on the check as presently explained. Below the space *i*, matter may be printed explanatory of the manner of operating and reading the check.

In preparing the check for issuance, the drawer will produce thereon by means of a suitable rubber stamp a small circle which will be made to inclose certain numerals in one or the other or both of the blocks *a, b*. Let it be assumed that the check is to be issued for $34.50 as shown in Fig. 2. The drawer will place the stamp on the block *a* so as to inclose the numeral 30 which is in horizontal alinement with the digit 4 in the column *d*, thus indicating $34. He will also place a stamp on the block *b* so as to encircle the numeral 50 which is in horizontal alinement with the cipher in the column *g*. It is apparent that if the stamp be made to encircle any of the numerals in the block *b* below the top line, the digit in the column *g* in horizontal alinement with the numeral on the block *b* encircled by the stamp will be read as cents added to the number of cents indicated by the numeral in the block *b* encircled by the stamp. The check will be dated by means of a date stamp and this will be so placed on the check as to cancel all numerals representing dollars to the left of the small stamp which indicates the tens of dollars for which the check is drawn. If desired other blocks of numerals may be provided to designate "hundreds" and "thousands" dollars. With the check as shown in the drawing hundreds dollars may be designated by causing the small stamp to encircle one of the digits in the column *c*. For instance, if the check represented by Fig. 2 is to be prepared for $134.50, the date stamp would be placed on some part of the check other than the block *a* and a small stamp made to encircle the numeral "1" in the column *c*.

Having fully described my invention what I claim as new and desire to secure by Letters-Patent,—

1. A check having thereon a series of blocks of numerals, the numerals of each block arranged in columns, all the numerals of each column being duplicates, the numerals of one block so designated that they represent tens of dollars, and the numerals of another block so designated that they represent tens of cents, each block having one column containing ciphers.

2. A check having thereon a series of blocks of numerals, the numerals of each block arranged in columns, all the numerals of each column being duplicates, the numerals of one block so designated that they represent tens of dollars, and the numerals of another block so designated that they represent tens of cents, each block having one column containing ciphers, and a column at one side of one of said blocks of numerals and having designations of hundreds of dollars and adapted to be read with designated numerals in the said blocks of numerals.

3. A check having thereon a series of blocks of numerals, the numerals of each block arranged in columns, all the numerals of each column being duplicates, the numerals of one block so designated that they represent tens of dollars, and the numerals of the other block so designated that they represent tens of cents, each block having one column containing ciphers, and a column at one side of one of said blocks of numerals and having designations of hundreds of dollars and adapted to be read with designated numerals in the said blocks of numerals, and a column at one side of another of said blocks and having units from 0 to 9 therein and designating cents.

4. A check having thereon a series of blocks of numerals, the numerals of each block arranged in columns, all the numerals of each column being duplicates, the numerals of one block so designated that they represent tens of dollars, and the numerals of the other block so designated that they represent tens of cents, each block having one column containing ciphers, a column at one side of one of said blocks having digits therein designating units dollars and readable with designated numerals of said block.

5. A check having thereon a series of blocks of numerals, the numerals of each block arranged in columns, all the numerals of each column being duplicates, the numerals of one block so designated that they represent tens of dollars, and the numerals of the other block so designated that they represent tens of cents, each block having one column containing ciphers, columns at each side of one of said blocks, one of said columns having digits designating hundreds of dollars, and the other column having digits designating units of dollars, digits of both columns readable with designated numerals of the blocks of numerals.

6. A check having thereon a series of blocks of numerals, the numerals of each block arranged in columns and all of the numerals of each of said columns being the same, and a column of digits from 0 to 9 at one side of each block and readable with designated numerals in the adjacent blocks of numerals.

In testimony whereof, I have signed this specification in the presence of two subscribing witnesses.

JOHN C. BELL.

Witnesses:
C. O. DUNN,
FRANK A. ROGERS.